United States Patent [19]

Gillingham et al.

[11] Patent Number: 5,036,659
[45] Date of Patent: Aug. 6, 1991

[54] SWASH PLATE TYPE PUMP WITH FLOW PATH THROUGH CAVITY CONTAINING SWASH PLATE

[75] Inventors: Gary D. Gillingham, Cherry Valley; Steven C. Paul, Rockford, both of Ill.

[73] Assignee: Sundstrand Corporation, Rockford, Ill.

[21] Appl. No.: 435,341

[22] Filed: Nov. 13, 1989

[51] Int. Cl.⁵ .......................................... F16D 31/02
[52] U.S. Cl. ...................................... 60/328; 60/444; 60/465; 60/468
[58] Field of Search ................. 60/443, 468, 444, 465, 60/489, 328; 91/505, 506, 486, 489

[56] References Cited

U.S. PATENT DOCUMENTS

| B 433,094 | 1/1976 | Hunck et al. | 60/465 |
|---|---|---|---|
| 3,650,107 | 3/1972 | Court | 60/443 |
| 3,760,687 | 9/1973 | Inaba et al. | 91/486 |
| 3,893,375 | 7/1975 | Hein et al. | 91/486 |
| 4,487,109 | 12/1984 | Burandt et al. | 91/506 |
| 4,627,329 | 12/1986 | Durtschi | 91/506 |
| 4,712,377 | 12/1987 | Yoshida et al. | 60/489 |
| 4,768,340 | 9/1988 | Hamilton | 60/489 |

FOREIGN PATENT DOCUMENTS 2147045 3/1973 Fed. Rep. of Germany ........ 91/506

Primary Examiner—Edward K. Look
Assistant Examiner—F. Daniel Lopez
Attorney, Agent, or Firm—Wood, Phillips, Mason, Recktenwald & VanSanten

[57] ABSTRACT

Overheating of hydraulic fluid in a hydraulic motor system subject to aiding loads can be avoided without paying a weight or volume penalty by providing a return port (64) adapted to be connected to the system return (22) in fluid communication with a cavity (46) within an hydraulic motor housing (32) that houses the swash plate (34). A pressure relief valve (62) is connected to the supply port (38) of the hydraulic motor (30) as well as to the return port (64) and is operative to open when the pressure at the supply port (38) increases as a result of an aiding load so as to allow recirculation of hydraulic fluid through the motor (30). By placing the swash plate cavity (46) in the recirculation line, increased heat sink capacity is added to the system without increasing weight or volume.

6 Claims, 2 Drawing Sheets

SWASH PLATE TYPE PUMP WITH FLOW PATH THROUGH CAVITY CONTAINING SWASH PLATE

FIELD OF THE INVENTION

This invention relates to hydraulic systems employing hydraulic motors, and more particularly, to such systems wherein so called aiding loads are encountered and which tend to drive the motor as a hydraulic pump.

BACKGROUND OF THE INVENTION

Hydraulic drive units including hydraulic motors are frequently used in aircraft to alter the configuration of various control surfaces such as flaps or the like. When an aircraft is in flight, aerodynamic forces acting on such control surfaces may actually act as aiding loads when the hydraulic system is being operated to change the position of the control surface. That is to say, in such cases the aerodynamic forces acting on the control surface being altered do not oppose the alteration, but rather, assist it.

When such occurs, the hydraulic motor may actually be driven by the control surface, rather than vice-versa and thus it will act as a pump. This in turn will result in the hydraulic motor pumping hydraulic fluid back toward the source of fluid under pressure. Many aircraft system designers prohibit such backflow from occurring for any of a variety of reasons. For one, filters in the supply line may be backflushed by backflow resulting from an aiding load and thus contaminate other systems that may be associated with the hydraulic fluid source.

In other systems which actually prohibit backflow, the possibility for failure of one or more system components which might disable the entire hydraulic system exists and if such failure cannot be isolated, control of the aircraft may be undermined.

Still other systems that prevent backflow act to recirculate backflow through the hydraulic motor as it acts as a pump to absorb the energy added to the system by the aiding load. Many of these systems, however, encounter overheating of the hydraulic fluid which is obviously undesirable. To avoid this possibility, the prior art has turned to the use of increased diameter hydraulic lines and/or longer hydraulic lines in the recirculation path so as to increase the volume of hydraulic fluid that is recirculated. Because the fluid quantity is increased, the energy absorbing ability of the hydraulic fluid, without overheating, is proportionately increased.

While this solution to the problem works well, it is not without drawbacks. Weight and volume constraints always exist in the design of aircraft. The increased capacity of the system increases the quantity of hydraulic fluid that must be utilized, thereby increasing weight. A weight increase is also found as a result of using a larger diameter conduit and/or longer conduits. Undesirable volume increases are also encountered as a result of the enlarged diameter of the conduits and/or increased length thereof.

The present invention is directed to overcoming one or more of the above problems.

SUMMARY OF THE INVENTION

It is the principal object of the invention to provide a new and improved hydraulic system including a motor which is useful in environments wherein the motor is subject to aiding loads. More particularly, it is an object of the invention to provide such a system wherein the energy of an aiding load may be absorbed by recirculating hydraulic fluid from the motor supply without increasing the diameter or length of hydraulic lines in the recirculation path.

An exemplary embodiment of the invention achieves the foregoing objects in a system that includes a variable displacement, rotary hydraulic motor having a housing, a swash plate pivotally mounted within the housing, a cavity within the housing receiving the swash plate, pistons within the housing and connected to the swash plate, a supply port operatively associated with the pistons and a return port connected to the cavity. A supply line is adapted to be connected to a source of hydraulic fluid under pressure and is connected to the supply port. Means are provided in the supply line which are operable to allow flow from a source to the supply port and prevent flow from the supply port toward the source. Means are also provided to interconnect the ports and are operative to allow flow from the supply port to the return port when an aiding load exists.

As a result of the foregoing construction, the volume of the recirculation path is increased by adding the volume of the existent swash plate cavity to the recirculation path. Consequently, conduits need not be enlarged or lengthened. Furthermore, by connecting the return line to the fluid return, the volume of hydraulic fluid need not be increased since, in the case of an aiding load, fluid may be drawn from the system return via the return line to act as makeup fluid for the recirculation loop.

In a preferred embodiment of the invention, the means that allow flow from a source to the supply port but prevent the reverse comprise a check valve in the supply line.

In a highly preferred embodiment, a pressure relief valve is utilized to interconnect the ports when a predetermined pressure exists at the supply port as a result of an aiding load.

The invention further contemplates the provision of a control piston connected to the swash plate for pivoting the same along with a servo valve in fluid circuit with the control piston for controlling the flow of hydraulic fluid thereto. A transducer is connected to the swash plate and is operative to supply signals representative of the position thereof so that the system may be useful in controlling the position of, for example, an aircraft control surface.

According to one embodiment of the invention, there is further provided a filter in the supply line along with a shut off valve in the supply line. A pilot valve is connected between the supply line and the return line and is adapted to receive signals and controls the shut off valve in response thereto.

Other objects and advantages will become apparent from the following specification taken in connection with accompanying drawings.

DESCRIPTION OF THE PREFERRED EMBODIMENT

Figure 1:
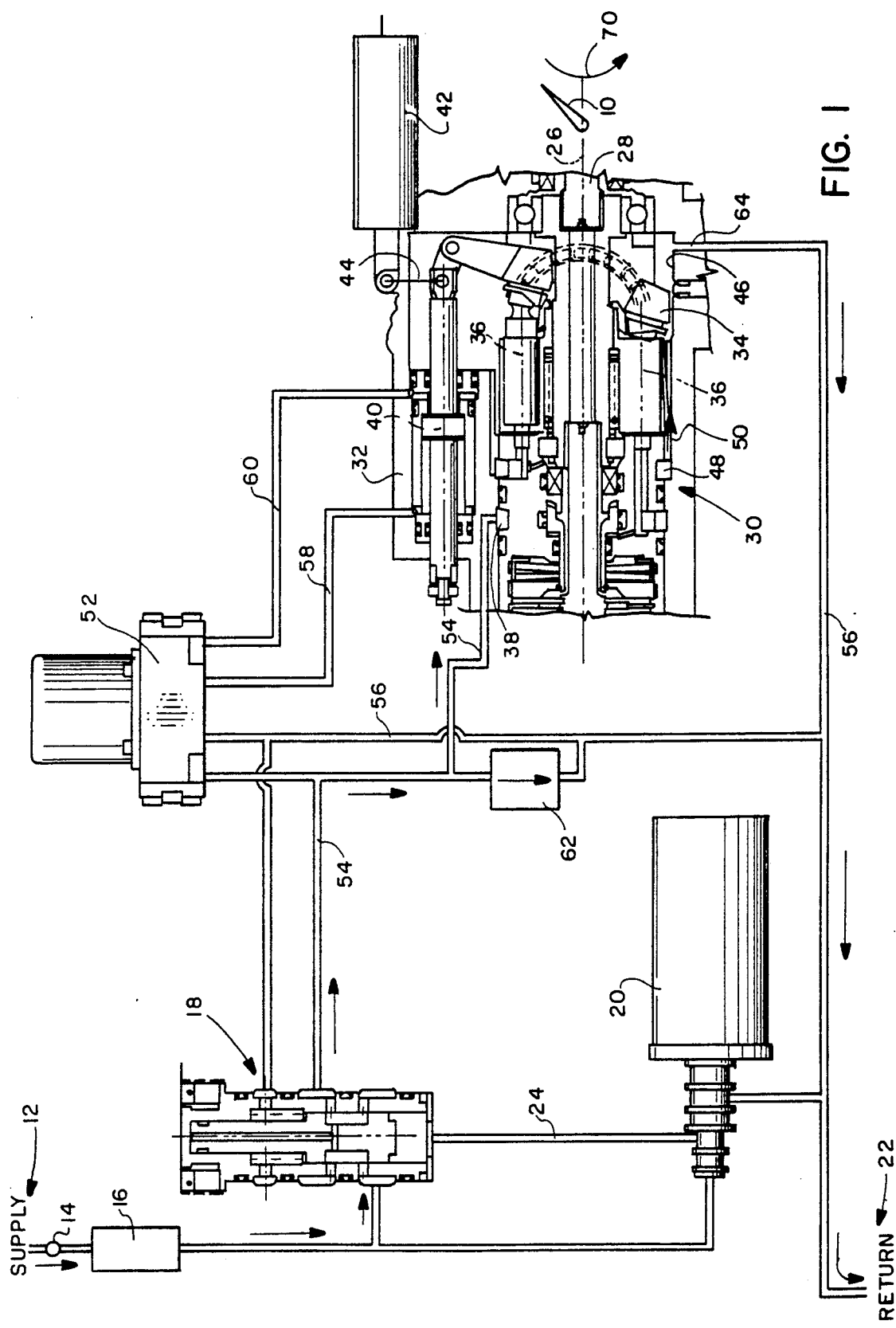
FIG. 1 is a somewhat schematic, somewhat mechanical drawing of a hydraulic motor system made according to the invention and illustrating fluid flow in the case of an opposing load.

An exemplary embodiment of a hydraulic motor system made according to the invention is illustrated in the drawings and with reference FIGS. 1 and 2 will be described principally in the environment of a system for controlling the position of a control surface 10 for an aircraft or the like. However, it is to be understood that the system is not so limited and may find use wherever backflow to a source of hydraulic fluid under pressure resulting from an aiding load situation is to be avoided.

Referring specifically to FIG. 1, a source or supply of hydraulic fluid under pressure is generally designated 12 and is connected to a check valve 14 which is operative to allow the flow of hydraulic fluid under pressure into the system illustrated but prevents the reverse. The outlet of the check valve 14 is connect to a conventional filter 16 and that in turn is connected to a conventional shut off valve, generally designated 18, which is pilot operated and may be utilized to isolate system components from the supply 12.

The source 12 also supplies hydraulic fluid under pressure to a pilot valve 20 connected to a system return, generally designated 22, and in response to signals received in the conventional manner from a source (not shown) modulates the pressure applied to a pilot line 24 extending to the shut off valve 18, and thus controls the condition of the latter.

The aircraft control surface 10 is connected by gearing or the like shown schematically at 26 to the rotary output shaft 28 of a variable displacement, hydraulic motor 30. The motor 30 is conventional and thus, only so much of it as is required to achieve an understanding of the invention will be mentioned. The same includes a housing 32 containing a pivotally mounted swash plate 34. The swash plate 34 is connected to pistons 36 which are adapted to receive fluid under pressure via a supply port 38 in the housing 30 to drive the shaft 28. The displacement of the motor is varied by pivoting the swash plate 34, and that is accomplished by means of control piston 40. In a typical system, the position of the swash plate 34, and thus the displacement of the motor 30, is monitored by any suitable transducer, such as an LVDT 42 connected to the swash plate 34 by the linkage shown schematically at 44.

Conventionally, the swash plate 34 is received within a cavity 46 within the housing 32 and hydraulically separate from the supply port 38. In many instances, the cavity 46 housing the swash plate 34 is hydraulically separate from the usual return port 48 but according to the invention, if such is the case, suitable provision such as removal of a seal or the like, is made to allow fluid flow in the direction of an arrow 50 from the conventional return port 48 to the interior of the cavity 46.

The system also includes a servo valve 52 of conventional construction. In a preferred embodiment, the servo valve 52 is a four-way, electro-hydraulic servo valve and is connected to a supply line 54 in fluid communication with the supply 12 and a return line 56 connected to the return 22. Lines 58 and 60 in fluid communication with opposite sides of the piston 40 provide hydraulic flow control signals to the latter to appropriately position the swash plate 34 and respond to an error signal generated by a conventional comparison of a commanded position signal and generated by a control and an actual position signal generated by the LVDT 42.

As illustrated, the supply line 54 extends to the supply port 38 and is also connected to one side of a pressure relief valve 62 which in turn is connected to the return line 56.

According the the invention, an additional port 64 is formed in the housing 32 and extends to the cavity 46 to be in fluid communication with the same. The port 64 is a return port and to this end is connected to the return line 56. Thus, the pressure relief valve 62 interconnects the supply port 38 and a return port 64 that is in fluid communication with the interior of the cavity 46.

In normal operation, that is, with the load opposing rotation of the shaft 28 as indicated by an arrow 70, fluid flow is as illustrated in FIG. 1. In this case, the pressure on the line 54 will be insufficient to cause the pressure relief valve 62 to open. Consequently, flow will be from the source 12 to the return 22 via the supply port 38 to the motor 30 and the return port 64 from the motor swash plate cavity 46. Control over the flow will be exerted in the usual fashion.

Figure 2:
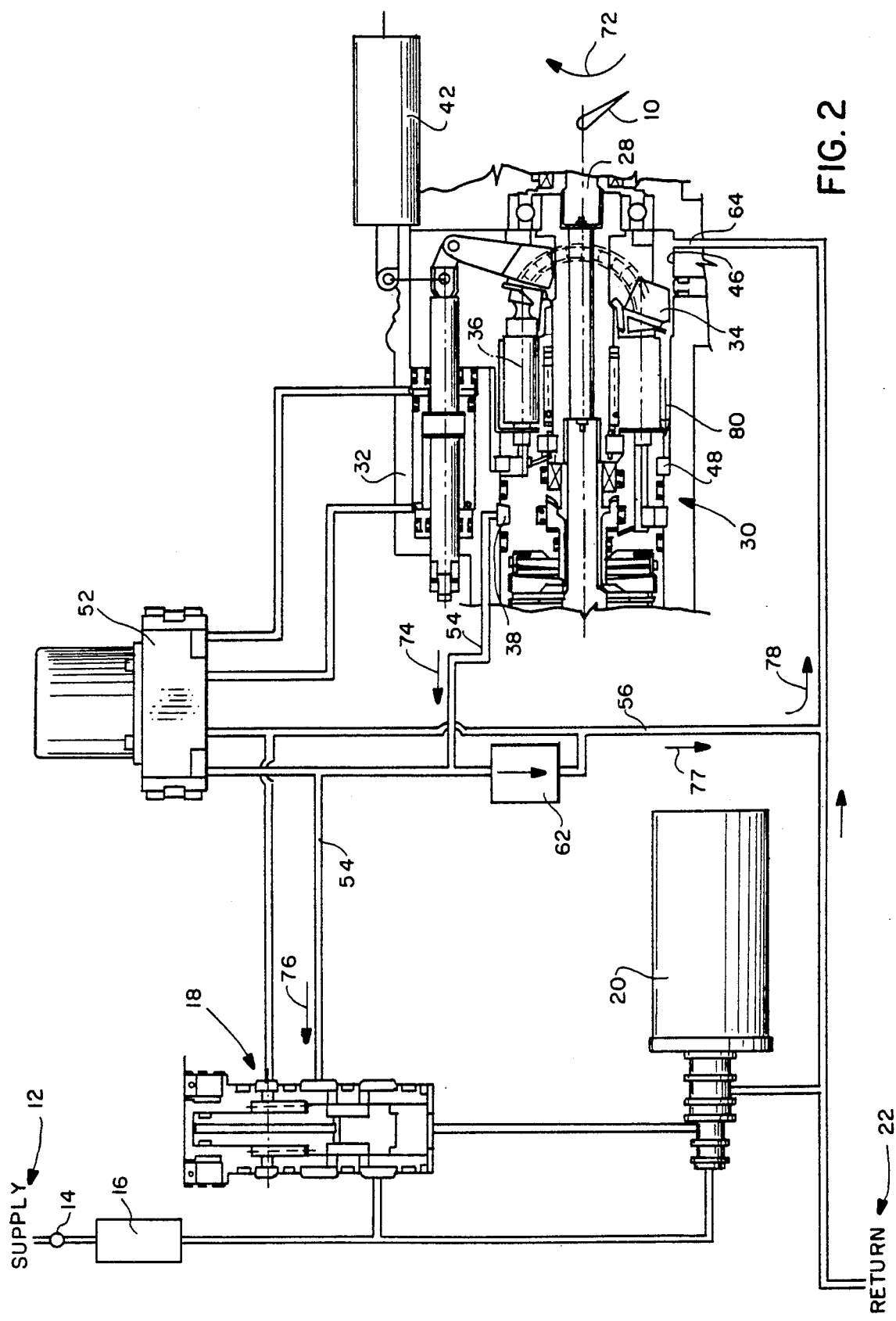
FIG. 2 is a view similar to FIG. 1 but illustrating fluid flow for an aiding load condition.

In the event an aiding load is encountered as indicated by the arrow 72 in FIG. 2, the aiding load will cause the control surface 10 to drive the motor 30 via the shaft 28 and thus act as a pump. As a consequence, the motor 30 will attempt to direct fluid back toward the supply 12 along the line 54 as illustrated by arrows 74 and 76. However, the check valve 14 will prevent such flow and thus prevent the filter 16 from being backflushed.

As a consequence, however, pressure will begin to rise in the line 54 and at some point, the pressure setting of the relief valve 62 will be reached and the latter will open allowing the flow of hydraulic fluid in the direction of the arrows 74, 77, and 78 that is, to the interior of the cavity 46 via the port 64. Once within the cavity 46, the fluid may flow in the direction of an arrow 80 to the conventional return port 48 to be pumped by the pistons 36 to the supply port 38.

It will be observed that when such occurs, by reason of the connection of the port 64 to the return 22, when the motor 30 begins to act as a pump such that the port 64 is on the suction side of the machine, fluid from the return 22 may be drawn into the cavity 46 as makeup fluid.

In any event, as long as the aiding load persists, the motor 30 acting as a pump will drive the fluid in the recirculation path illustrated and previously described. Because, however, the path includes the cavity 46 which may be filled with the make up fluid from the return 22 during operation, the volume of the recirculating loop is greatly increased without increasing the length or cross sectional area of the lines 54 and 56 through which recirculation takes place. Similarly, because fluid is drawn from the return 22, there need be no substantial increase in the amount of fluid carried and needed to fill the recirculation path to provide a sufficient heat sink capacity and prevent the fluid from overheating.

Thus, the invention, through the relatively simple expedient of introducing the swash plate cavity 46 into the recirculation path achieves a hydraulic motor system, ideally suited for those environments wherein aiding loads may be encountered and avoids problems with overheating of the hydraulic fluid during recirculation without paying weight and/or volume penalties.

We claim:

1. In a hydraulic motor system subject to aiding loads attempting to drive the motor as a pump, the combination of:
   a variable displacement rotary hydraulic motor having a housing, a swash plate pivotally mounted within the housing, a cavity within the housing receiving the swash plate, pistons within the housing and connected to the swash plate, a supply port operatively associated with said pistons to normally provide hydraulic fluid thereto, said pistons further being operatively associated with said cavity to normally discharge fluid received from said supply port into said cavity, and a return port connected to said cavity, said supply port, said piston, said cavity and said return port defining a flow path through said motor for said hydraulic fluid whereby the motor is driven by hydraulic fluid flowing in said flow path from said supply port to said return port and may act as a pump when driven to pump fluid from said return port to said supply port;
   a supply line adapted to be connected to a source of hydraulic fluid under pressure and connected to said supply port;
   a check valve in said supply line for allowing flow from a source to said supply port but not the reverse; and
   a pressure relief valve interconnecting said ports and operative to allow flow from said supply port to said return port when a predetermined pressure exists at said supply port as a result of an aiding load to establish recirculation of fluid through said cavity when said motor is acting as a pump to thereby increase the heat sink capacity of the system without substantially increasing weight or volume thereby.

2. The system of claim 1 further including a control piston connected to said swash plate for pivoting the same, a servo valve in fluid circuit with said control piston for controlling the flow of hydraulic fluid thereto, and a transducer connected to said swash plate and operative to provide signals representative of the position thereof.

3. The system of claim 1 further including a system return and a return line connected to said return and said return port whereby fluid may be drawn from said return during an aiding load to act as make-up fluid.

4. In a hydraulic motor system subject to aiding loads attempting to drive the motor of a pump, the combination of:
   a variable displacement rotary hydraulic motor having a housing, a swash plate pivotally mounted within the housing, a cavity within the housing receiving the swash plate, pistons within the housing and connected to the swash plate, a supply port operatively associated with said pistons to normally provide hydraulic fluid thereto, said pistons further being operatively associated with said cavity to normally discharge fluid received from said supply port into said cavity, and a return port connected to said cavity, said supply port, said piston, said cavity and said return port defining a flow path through said motor for said hydraulic fluid whereby the motor is driven by hydraulic fluid flowing in said flow path from said supply port to said return port and may act as a pump when driven to pump fluid from said return port to said supply port;
   a supply line adapted to be connected to a source of hydraulic fluid under pressure and connected to said supply port;
   a check valve in said supply line for allowing flow from a source to said supply port but not the reverse;
   a pressure relief valve interconnecting said ports and operative to allow flow from said supply port to said return port when a predetermined pressure exists at said supply port as a result of an aiding load to establish a path for the recirculation of hydraulic fluid through said cavity when said motor acts as a pump;
   a filter in said supply line;
   a return line connected to said return port;
   a shut off valve in said supply line;
   a pilot valve connected between said supply line and said return line and adapted to receive signals and control said shut off valve in response thereto;
   a servo valve connected to said lines and providing signals for positioning said swash plate; and
   an actuator for receiving signals from said servo valve and positioning said swash plate.

5. The system of claim 4 further including an aircraft control surface coupled to said motor.

6. In a hydraulic motor system subject to aiding loads attempting to drive the motor as a pump, the combination of:
   a variable displacement rotary hydraulic motor having a housing, a swash plate pivotally mounted within the housing, a cavity within the housing receiving the swash plate, pistons within the housing and connected to the swash plate and normally operable to discharge hydraulic fluid into said cavity, a supply port operatively associated with said pistons, and a return port connected to said cavity;
   a supply line adapted to be connected to a source of hydraulic fluid under pressure and connected to said supply port;
   means in said supply line and operable to allow flow from a source to said supply port and prevent flow from said supply port toward said source; and
   means interconnecting said ports for allowing flow from said supply port to said return port when an aiding load exists to establish a path of recirculation of hydraulic fluid through said cavity to thereby provide a relatively large volume recirculation loop due to the presence of said cavity therein.

* * * * *